(12) United States Patent
Egami et al.

(10) Patent No.: US 7,513,685 B2
(45) Date of Patent: Apr. 7, 2009

(54) TEMPERATURE SENSITIVE PAINT FOR AN EXTENDED TEMPERATURE RANGE

(75) Inventors: Yasuhiro Egami, Gottingen (DE); Uwe Fey, Dransfeld (DE); Christian Klein, Gottingen (DE); Jurgen Quest, Roesrath (DE); Uwe Beifuss, Ohmden (DE); Vladimir Ondrus, Stuttgart-Birkach (DE)

(73) Assignees: Deutsches Zentrum für Luft-und Raumfahrt e.V., Köln (DE); European Transonic Windtunnel GmbH, Köln (DE)

( * ) Notice: Subject to any disclaimer, the term of this patent is extended or adjusted under 35 U.S.C. 154(b) by 17 days.

(21) Appl. No.: 11/773,547

(22) Filed: Jul. 5, 2007

(65) Prior Publication Data

US 2009/0010306 A1 Jan. 8, 2009

(51) Int. Cl.
*G01K 11/00* (2006.01)
*G01N 33/00* (2006.01)

(52) U.S. Cl. .................................. 374/161; 252/408.1

(58) Field of Classification Search ................. 374/161; 252/408.1
See application file for complete search history.

(56) References Cited

U.S. PATENT DOCUMENTS

| 5,971,610 | A | * | 10/1999 | Kolodner et al. ............. 374/161 |
| 2005/0040368 | A1 | | 2/2005 | Iijima et al. |
| 2005/0288475 | A1 | * | 12/2005 | Hamner ........................ 528/44 |

OTHER PUBLICATIONS

Fey, et al., High Reynolds Number Transition Detection by Means of Temperature Sensitive Paint, Am. Inst. of Aeronautics and Stronautics, 44th AIAA, Jan. 9-12, 2006, Reno, NV.
Fey, et al., "Transition Detection by Temperature Sensitive Paint . . .", 20th ICIASF 2003, Gottingen, Germany, Aug. 25-29, 2003, pp. 77-88.
Asai, et al., "Boundary-Layer Transition Detection in a Cryogenic Wind Tunnel . . .", Journal of Aircraft, vol. 34, No. 1, Jan.-Feb. 1997, pp. 34-42.
Iijima, et al., "Optimization of Temperature-Sensitive Paint Formulation . . ." 20th ICIASF 2003, Gottingen, Germany, Aug. 25-29, 2003, pp. 70-76.
Sweeting, et al., "Determination of Enantiomeric Purity of Polar Substrates with Chiral Lanthanide . . .", J. Org. Chem. 1987, vol. 52, pp. 2273-2276.

* cited by examiner

*Primary Examiner*—Gail Verbitsky
*Assistant Examiner*—Mirellys Jagan
(74) *Attorney, Agent, or Firm*—Thomas, Kayden, Horstemeyer & Risley, LLP

(57) ABSTRACT

A temperature sensitive paint comprises a binder for forming a polymer matrix, a transition metal complex embedded in the binder and displaying a temperature dependent fluorescence, the fluorescence of the transition metal complex showing a maximum relative temperature sensitivity per Kelvin at a first temperature, and a rare earth complex also embedded in the binder and displaying a temperature dependent fluorescence, the fluorescence of the rare earth complex showing a maximum relative temperature sensitivity per Kelvin at a second temperature. The second temperature is higher than the first temperature by 50 to 150 Kelvin so that the overall temperature range covered by both complexes as temperature probes is extended.

16 Claims, 5 Drawing Sheets

US 7,513,685 B2

TEMPERATURE SENSITIVE PAINT FOR AN EXTENDED TEMPERATURE RANGE

FIELD OF THE INVENTION

The present invention generally relates to temperature sensitive paints. More particularly, the invention relates to temperature sensitive paints comprising a binder for forming a polymer matrix and a probe substance embedded in the binder which displays a temperature dependent fluorescence. Even more particularly, the invention relates to a temperature sensitive paint which forms a solid coating when applied to a surface, and which allows for measuring the temperature at the surface by measuring the present intensity of fluorescence light emitted by the probe substance when excited for fluorescence by excitation light typically having a shorter wave length than the fluorescence light. Due to the fluorescence depending on the temperature, the actual intensity of the fluorescence light represents to the actual temperature at the surface coated with the temperature sensitive paint.

BACKGROUND OF THE INVENTION

A temperature sensitive paint comprising a binder for forming a polymethylene methacrylate matrix and a rare earth complex as a probe embedded in the binder which displays a temperature dependent fluorescence is known from U.S. Pat. No. 5,971,610. The full disclosure of this patent is incorporated herein by reference. The particular rare earth complexes disclosed in U.S. Pat. No. 5,971,610 as temperature probes include $Eu(tfc)_3$ and $Eu(hfc)_3$ complexes. An alternative binder mentioned in U.S. Pat. No. 5,971,610 is polystyrene. The fluorescence of the rare earth complexes according to U.S. Pat. No. 5,971,610 shows a maximum relative temperature sensitivity within a temperature range of about 100 to 160 Kelvin. It is told that between $Eu(tfc)_3$ and $Eu(hfc)_3$ complexes, the entire temperature range of 30 to 300 Kelvin can be covered. None of the disclosed temperature sensitive paints however, can cover this temperature range alone.

The basic procedure according to U.S. Pat. No. 5,971,610 of using the disclosed temperature sensitive paint is applying the paint to a surface of an electronic device and to obtain power-on and power-off fluorescence images of the coated device with the device being powered or not. A variation of this basic technique employs a paint which emits radiation at two wavelengths with quantum yields that depend differently on temperature. Here, the ratio of the image made at the two different wavelengths yields a correctly normalized temperature map without the need to acquire images at two power levels. This method requires that the radiation emitted at both wavelengths is emitted at the same time, i.e. at the same temperature.

A temperature sensitive paint comprising a binder for forming a polyurethane matrix and a transition metal complex embedded in the binder displaying a temperature dependent fluorescence is known from US 2005/0040368 A1. The full disclosure of this patent application is also incorporated herein by reference. The transition metal complex used as a temperature probe is a ruthenium complex, particularly a Ru(trpy) complex. The temperature sensitive paint known from US 2005/0040368 A1 is particularly suitable for use on the surfaces of models in cryogenic wind tunnels. It displays an usable temperature sensitivity in the temperature range of about 100 to 240 Kelvin. However, the fluorescence light intensity of the known temperature sensitive paint rapidly becomes very weak, when the temperature rises to more than 230 Kelvin. As a result, temperature measurements in a range above 230 Kelvin are actually impossible when employing this known temperature sensitive paint.

Thus, there is a need for a temperature sensitive paint suitable for use in cryogenic wind tunnels which allows for measuring temperatures at the surface of a model in such a wind tunnel within an extended temperature range.

SUMMARY OF THE INVENTION

In one aspect, the present invention provides a temperature sensitive paint comprising a binder for forming a polymer matrix, a transition metal complex embedded in the binder and displaying a temperature dependent fluorescence, the fluorescence of the transition metal complex showing a maximum relative temperature sensitivity at a first temperature, and a rare earth complex also embedded in the binder and displaying a temperature dependent fluorescence, the fluorescence of the rare earth complex showing a maximum relative temperature sensitivity at a second temperature, the second temperature being higher than the first temperature by 50 to 150 Kelvin.

The relative temperature sensitivity is the percentage of a change in the fluorescence light intensity per Kelvin change in temperature under otherwise unchanged conditions.

The difference in the temperatures of maximum relative temperature sensitivity also result in a difference of the maximum temperatures at which the two temperature probes still emit fluorescent light at a sufficient intensity to be evaluated. The temperature probe having the higher temperature of maximum relative temperature sensitivity also has a higher maximum temperature at which it still emits enough fluorescent light to be evaluated.

In the temperature sensitive paint according to the invention, the second temperature is typically higher than the first temperature by 60 to 120 Kelvin. Thus, the extension of the temperature range covered by the temperature sensitive paint according to the invention is maximized without a gap of temperature sensitivity being formed between the temperature subranges of both temperature probes.

Preferably, the transition metal complex in the temperature sensitive paint according to the invention is rare transition metal complex, and even more preferably it is a ruthenium complex. Most preferably, it is a Ru(trpy) complex. At the same time the rare earth complex in the temperature sensitive paint according to the invention preferably is a europium complex. Most preferably, it is an $Eu(tfc)_3$ or an $Eu(hfc)_3$ complex.

With these particular ruthenium and europium complexes, for example, fluorescence light emitted by the transition metal complex and fluorescence light emitted by the rare earth complex have essentially same wavelengths. At least both wavelengths of the fluorescence lights can be registered by a single sensor comprising a narrow bandwidth filter.

Nevertheless, both probes in the temperature sensitive paint according to the invention can be measured, i.e. excited for fluorescence, separately, as an excitation light range for exciting the fluorescence of the transition metal complex and an excitation light range for exciting the fluorescence of the rare earth complex have different wavelengths when using the above mentioned ruthenium and europium complexes, for example.

Vice versa, the two probes in the temperature sensitive paint according to the invention can also be measured separately, if fluorescence light emitted by the transition metal complex and fluorescence light emitted by the rare earth complex have distinguishable wavelengths. In this case, an excitation light range for exciting the fluorescence of the transition metal complex and an excitation light range for exciting the fluorescence of the rare earth complex may comprise same wavelengths at which both complexes can be excited simultaneously.

The binder of the temperature sensitive paint according to the invention preferably forms a polyurethane matrix. Such a polyurethane matrix is advantageously suited for use under cryogenic conditions in wind tunnels.

In a further aspect, the present invention provides a temperature sensitive paint comprising a binder for forming a polyurethane matrix, a Ru(trpy) complex which is embedded in the binder and displays a temperature dependent fluorescence, the fluorescence of the transition metal complex showing a maximum relative temperature sensitivity at a first temperature, the Ru(trpy) complex serving as a first temperature probe in a first temperature range about the first temperature, and a europium complex selected from an $Eu(tfc)_3$ complex and an $Eu(hfc)_3$ complex which is also embedded in the binder and displays a temperature dependent fluorescence, the fluorescence of the rare earth complex showing a maximum relative temperature sensitivity at a second temperature, the europium complex serving as a second temperature probe in a second temperature range about the second temperature, the second temperature being higher than the first temperature by 60 to 120 Kelvin, fluorescence light emitted by the transition metal complex and fluorescence light emitted by the rare earth complex having essentially same wavelengths, and an excitation light range for exciting the fluorescence of the transition metal complex and an excitation light range for exciting the fluorescence of the rare earth complex having different wavelengths.

Other features and advantages of the present invention will become apparent to one with skill in the art upon examination of the following drawings and the detailed description. It is intended that all such additional features and advantages be included herein within the scope of the present invention, as defined by the claims.

DETAILED DESCRIPTION

In a typical measurement campaign in cryogenic wind tunnels, the tunnel temperature is decreased from 300 K down to 100 K according to the Reynolds number selected for the actual experiment. The operation of the wind tunnel becomes more expensive for the lower temperatures because more liquid nitrogen is permanently needed for cooling. Therefore, all system checks are performed at ambient temperatures (around 300 K) before cooling down. With a single probe temperature sensitive paint it is not possible to both check the temperature measurement arrangement at ambient temperature and use it at cryogenic temperatures. If the single probe temperature sensitive paint is tuned to the cryogenic temperature range, possible failures of the temperature measurement setup can only be detected after cooling the wind tunnel down, and additional adjustment or repair requires warming the complete wind tunnel up, resulting in a long and expensive delay. Furthermore, in a typical measurement campaign data for lower Reynolds numbers (for example Reynolds numbers in the range from 1 Million to 5 Million) is gathered as well as for high Reynolds numbers (for example in a range of 5 Million to 30 Million). This requires operation of the wind tunnel and temperature measurements in a large temperature range.

Figure 1:
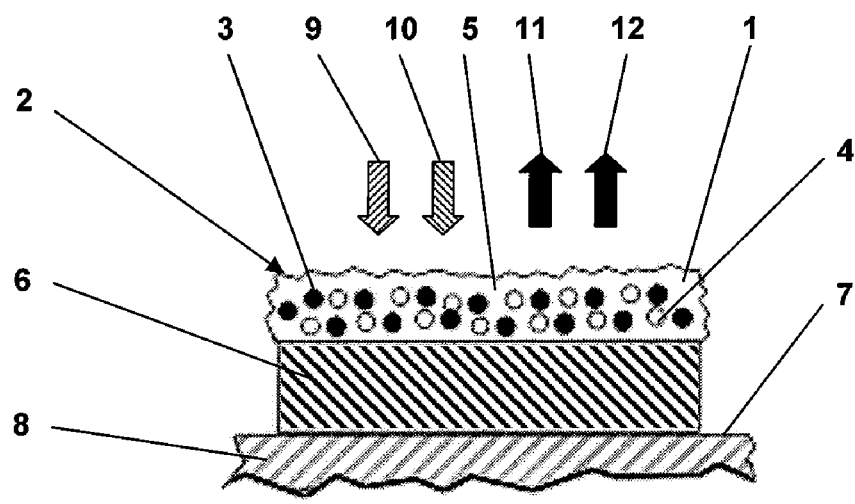
FIG. 1 is a simplified cross section through a layer of the temperature sensitive paint according to the invention located on a screen layer on a surface of a model to be placed in a cryogenic wind tunnel.

Referring now in greater detail to the drawings, FIG. 1 illustrates an active layer 1 of the temperature sensitive paint 2 according to the invention which comprises two different probes 3 and 4 for measuring temperatures in an extended temperature range. The probes 3 and 4 are ruthenium and europium complexes. In the cured layer 1 shown in FIG. 1, both complexes are embedded in a polyurethane matrix 5 which has been formed by a binder upon curing of a liquid binder. This binder may for example be the polyurethane top coat Aerodur® Clearcoat UVR, available from Akzo Nobel Areospace Coatings of Waukegan, Ill., USA, which may be used according to the supplier's recommendations. The layer 1 has been applied to a screen layer 6 providing a uniformly colored background for the temperature sensitive paint 2 on a surface 7 of a model 8 to be placed in a wind tunnel. Neither the model 8 nor the layers 1 and 6 are depicted completely here. The screen layer 6 has a typical thickness of about 60 µm whereas the layer 1 of the temperature sensitive paint 2 has a typical thickness of 40 µm. For measuring the temperature using the probes 3 and 4 in the layer 1, excitation light 9 is used to excite the probe 3 for fluorescence, and excitation light 10 having a different wavelength than the excitation light 9 is used for exciting the probe 4 for fluorescence. Both the intensities of fluorescence light 11 from the excited probe 3 and of fluorescence light 12 from the probe 4 change with changes of the temperature at the surface 7. Thus, by comparing the actual intensities of the fluorescence light 11 and the fluorescence light 12 with their intensities at a known temperature, the actual temperature at the surface 7 can be determined.

The two different probes 3 and 4 in the temperature sensitive paint according to the invention extend the temperature range in which the temperature at the surface 7 can be measured by means of the intensity of the fluorescence light 11 and the fluorescence light 12. To this end, the probes 3 and 4 are selected in such way that they display ranges of useable relative temperature sensitivity following each other with decreasing or increasing temperature, and only showing a minor overlap.

Figure 2:
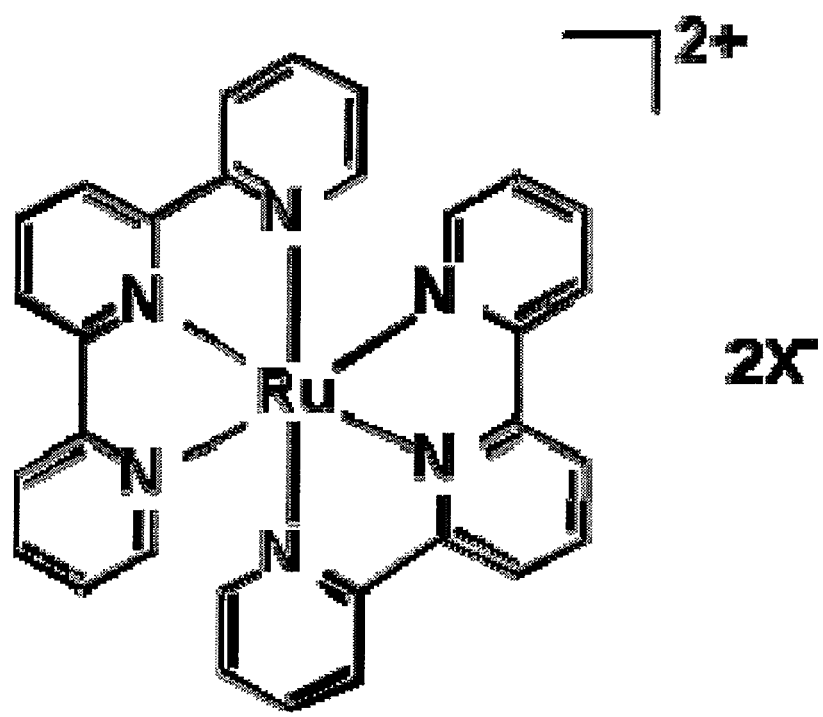
FIG. 2 is a structural formula of a ruthenium complex to be used in the temperature sensitive paint according to the invention.

Generally, the probe 3 is a transition metal complex. Preferably it is a ruthenium complex, and most preferably it is the ruthenium complex which structural formula is shown in FIG. 2. This ruthenium complex is Di(tripyridyl)ruthenium (II) $(Ru(trpy)_2^{2+})$. This ruthenium complex is, for example, commercially available from GFS Chemicals, Inc. of Powell, Ohio, USA as bis-(2,2'-2"-terpyridine)ruthenium(II)chloride (item #2377).

The probe 4 generally is a rare earth complex. Preferably it is a europium complex, and most preferable it is one of the following complexes:

Europium tris[3-(trifluoromethylhydroxymethylene)-(+)-camphorate] (denoted here as $Eu(tfc)_3$),
Europium tris[3-(trifluoromethylhydroxymethylene)-(−)-camphorate] (optical isomer of $Eu(tfc)_3$),
Europium tris[3-(heptafluoropropylhydroxymethylene)-(+)-camphorate] (denoted here as $Eu(hfc)_3$), and
Europium tris[3-(heptafluoropropylhydroxymethylene)-(+)-camphorate] (optical isomer of $Eu(hfc)_3$).

The following table 1 further specifies these europium complexes which may be used as a probe 4 in the temperature sensitive paint 2 of FIG. 1. Table 1 also indicates which figure shows the structural formula of the respective europium complex.

TABLE I

Europium tris[3-(trifluoromethylhydroxymethylene)-(+)-camphorate]

Figure 3:
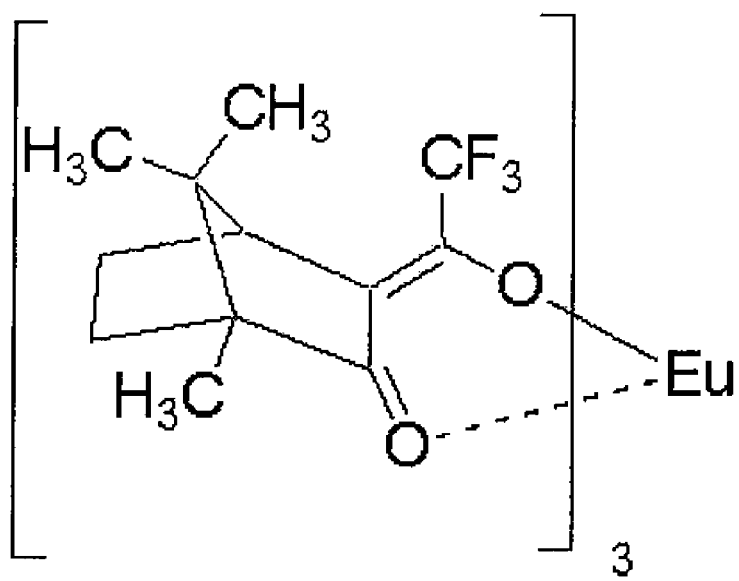
FIG. 3 is a structural formula of a first europium complex to be used in the temperature sensitive paint according to the invention.

| | |
|---|---|
| Synonyme: | $Eu(facam)_3$ |
| | $Eu(tfc)_3$ |
| | Europium(III) tris[3-(trifluoromethylhydroxymethylene)-d-camphorate] |
| | Tris(3-trifluoroacetyl-d-camphorato)europium(III) |
| | Tris[3-(trifluoromethylhydroxymethylene)-d-camphorato]europium(III) |
| Molecular Formula: | $C_{36}H_{42}EuF_9O_6$ |
| Molecular Weight: | 893.66 |
| Structural Formula: | FIG. 3 |

Europium tris[3-(trifluoromethylhydroxymethylene)-(−)-camphorate]

Figure 4:
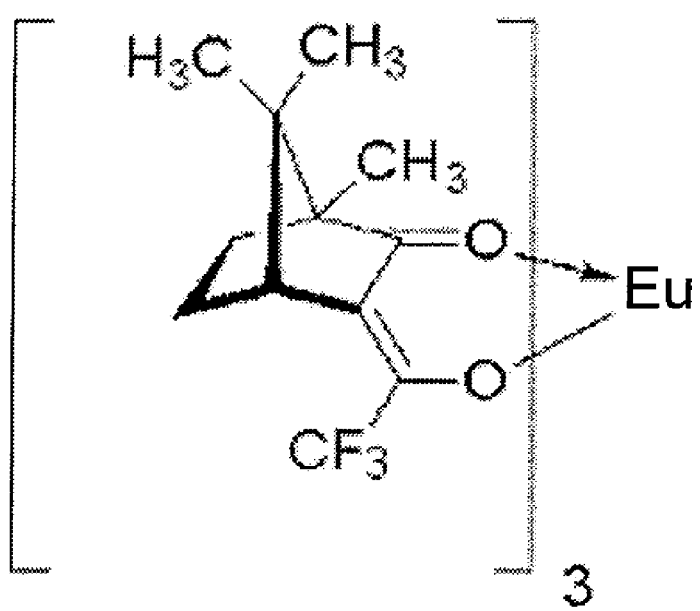
FIG. 4 is a structural formula of an optical isomer of the europium complex shown in FIG. 3 which is also suitable for use in the temperature sensitive paint according to the invention.

| | |
|---|---|
| Molecular Formula: | $C_{36}H_{42}EuF_9O_6$ |
| Molecular Weight: | 893.66 |
| EG/EC Number: | 2522329 |
| Structural Formula: | FIG. 4 |

Europium tris[3-(heptafluoropropylhydroxymethylene)-(+)-camphorate]

Figure 5:
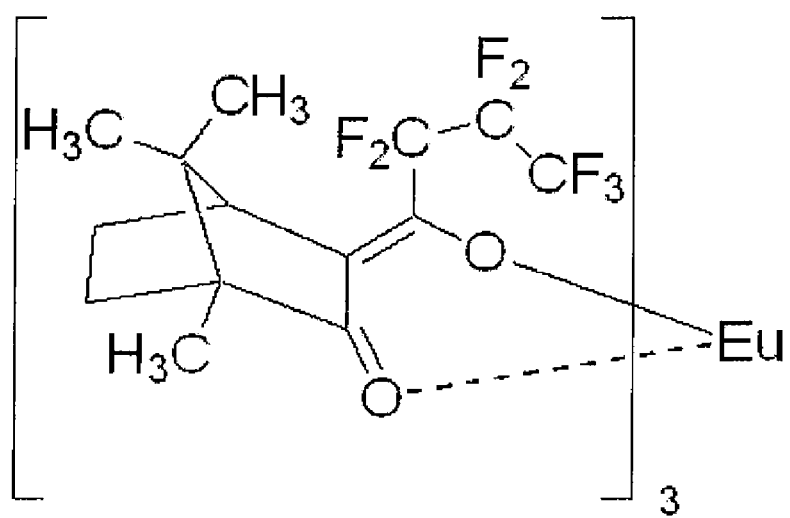
FIG. 5 is a structural formula of another europium complex for use in the temperature sensitive paint according to the present invention.

| | |
|---|---|
| Synonyme: | $Eu(hfc)_3$ |
| | Europium(III) tris[3-(heptafluoropropylhydroxymethylene)-d-camphorate] |
| | Tris[3-(heptafluoropropylhydroxymethylene)-d-camphorato]europium(III) |
| Molecular Formula: | $C_{42}H_{42}EuF_{21}O_6$ |
| Molecular Weight: | 1193.71 |
| CAS Number: | 34788-82-4 |
| EG/EC Number: | 2522140 |
| Structural Formula: | FIG. 5 |

Europium tris[3-(heptafluoropropylhydroxymethylene)-(−)-camphorate]

Figure 6:
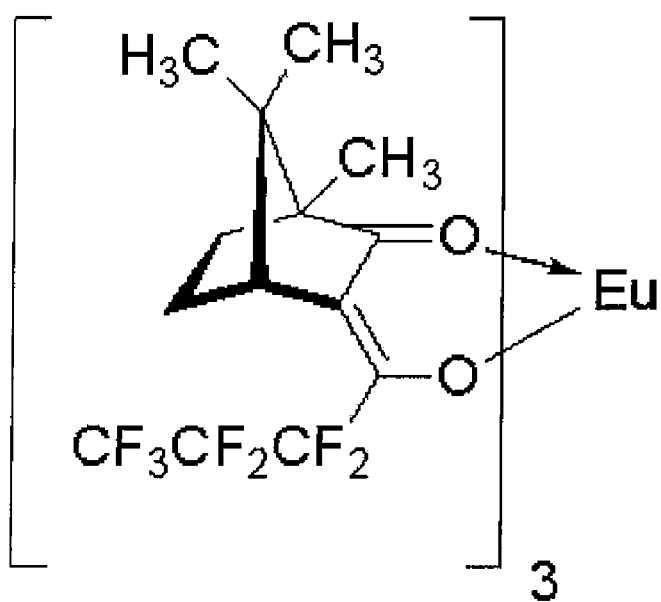
FIG. 6 is an optical isomer of the europium complex according to FIG. 5 which is also suitable for use in the temperature sensitive paint according to the present invention.

| | |
|---|---|
| Synonyme: | Europium(III) tris[3-(heptafluoropropylhydroxymethylene)-l-camphorate] |
| | Tris[3-(heptafluoropropylhydroxymethylene)-l-camphorato]europium(III) |
| Molecular Formula: | $C_{42}H_{42}EuF_{21}O_6$ |
| Molecular Weight: | 1193.71 |
| Structural Formula: | FIG. 6 |

Figure 7:
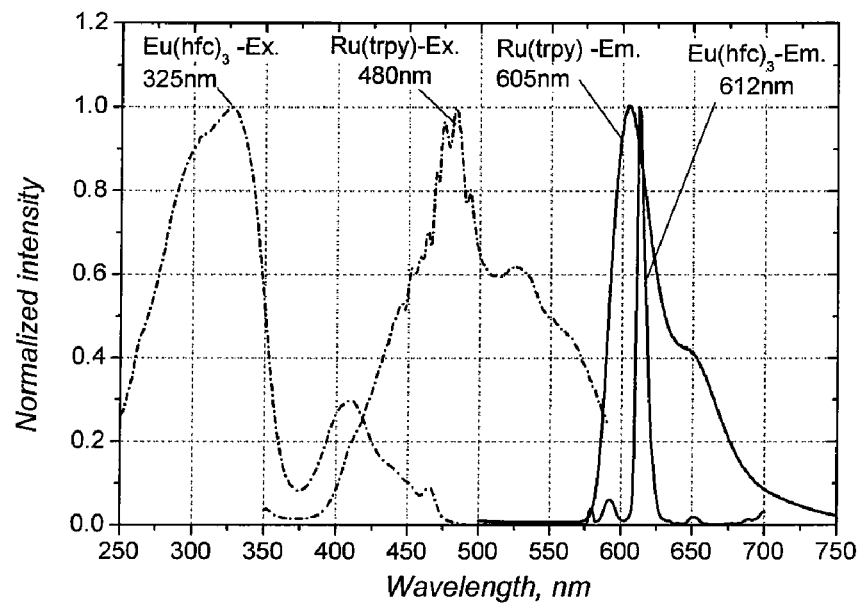
FIG. 7 shows the excitation and emission spectra of a first embodiment of the temperature sensitive paint according to the present invention using the complexes according to FIGS. 2 and 5.
Figure 8:
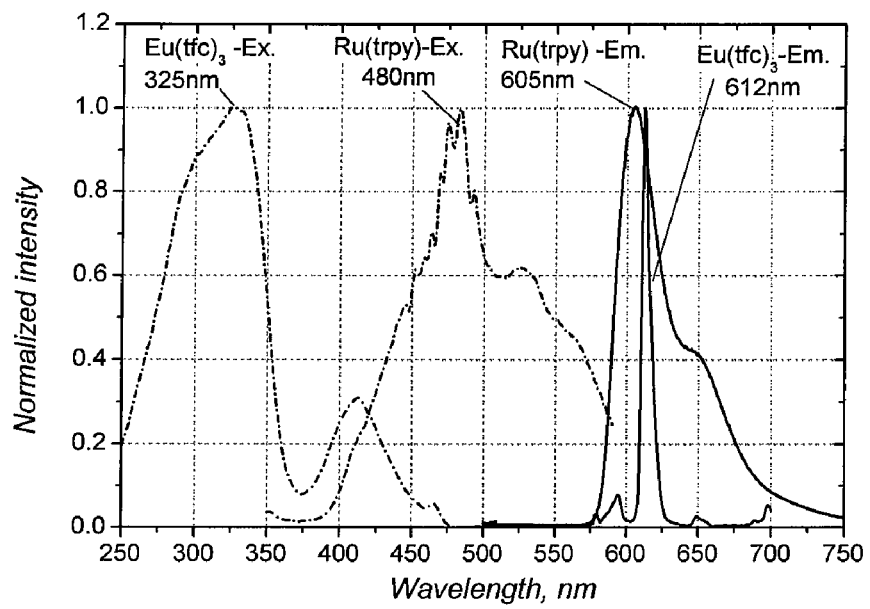
FIG. 8 shows the excitation and emission spectra of the temperature sensitive paint according to the invention comprising the complexes of FIGS. 2 and 3.
Figure 9:
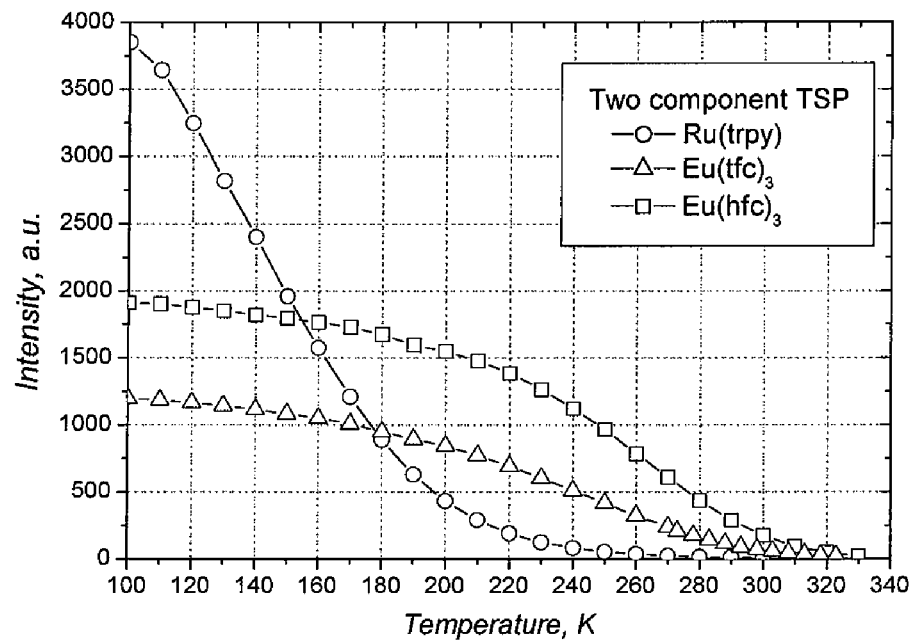
FIG. 9 is a plot of the intensity changes of fluorescence light from the complexes according to FIGS. 2, 3 and 5 by temperature.
Figure 10:
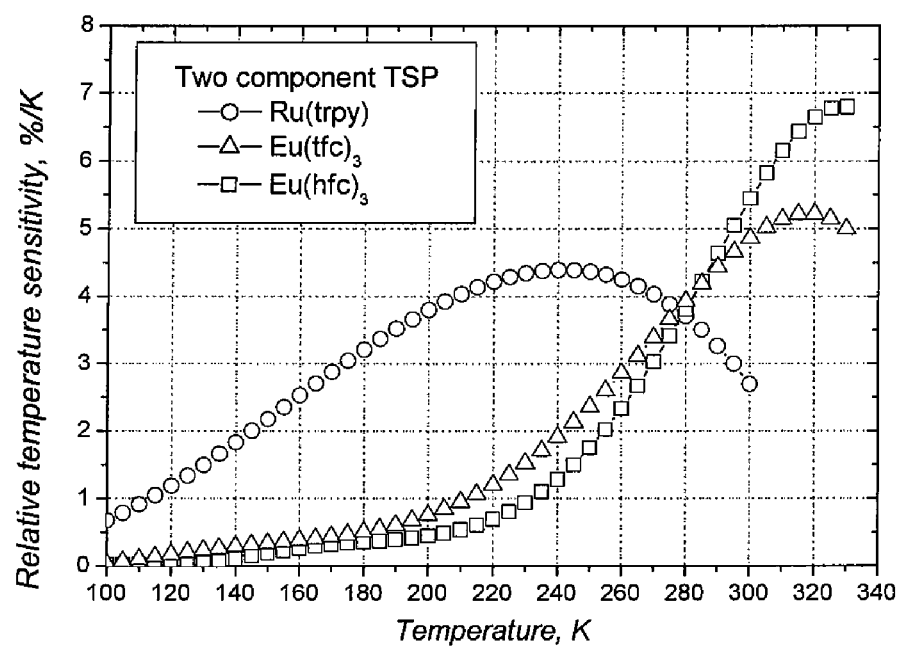
FIG. 10 is a plot of the relative temperature sensitivity of the complexes according to FIGS. 2, 3 and 5 by temperature.

Whereas the excitation light 9 for the ruthenium complex according to FIG. 2 as the probe 3 has a typical wavelength of 480 nm, the typical wavelength of the excitation light 10 for the europium complexes listed above is 325 nm. This difference in the wavelengths of the excitation light 9 and the excitation light 10 allows for selectively exciting the probes 3 and 4 for fluorescence. I.e. at 325 nm only the probe 4 is excited, and at 480 nm only the probe 3 is excited. The fluorescence light 11 und 12 from both probes 3 and 4, however, have about same wavelengths. This can be seen from the excitation and emission spectra shown in FIG. 7 and FIG. 8. The fluorescence light 11 and 12 from both probes 3 and 4 can thus be registered by a same sensor, i.e. a single camera/filter combination sensitive in a range of about 600 to 625 nm. By illuminating the temperature sensitive paint at different wavelengths, the probes 3 and 4 in the temperature sensitive paint can selectively be used to measure the temperature. The ruthenium complex used as the probe 3 is particularly suited for temperatures up to 230 Kelvin. This temperature range is limited towards high temperatures by the remaining small absolute intensity of the fluorescence light 11 which falls below suitable limits at high temperatures, see FIG. 9. The relative temperature sensitivity of the ruthenium complex only reaches its maximum at about 240 Kelvin (see FIG. 10). In the temperature range beginning at about 210 to 230 Kelvin, the europium complexes employed as the probe 4 in the temperature sensitive paint according to the invention both display a suitable relative temperature sensitivity (see FIG. 12), and still provide a sufficient intensity of the fluorescence light 12 up to a temperature of 270 to 300 Kelvin (depending on the actual europium complex, see FIG. 9).

Many variations and modifications may be made to the preferred embodiments of the invention without departing substantially from the spirit and principles of the invention. All such modifications and variations are intended to be included herein within the scope of the present invention, as defined by the following claims.

We claim:

1. A temperature sensitive paint comprising:
    a binder for forming a polymer matrix,
    a transition metal complex embedded in the binder and displaying a temperature dependent fluorescence, the fluorescence of the transition metal complex showing a maximum relative temperature sensitivity at a first temperature, the transition metal complex serving as a first temperature probe,
    a rare earth complex also embedded in the binder and displaying a temperature dependent fluorescence, the fluorescence of the rare earth complex showing a maximum relative temperature sensitivity at a second temperature, the rare earth complex serving as a second temperature probe, and
    the second temperature being higher than the first temperature by 50 to 150 Kelvin.

2. The temperature sensitive paint of claim 1, wherein the second temperature is higher than the first temperature by 60 to 120 Kelvin.

3. The temperature sensitive paint of claim 1, wherein fluorescence light emitted by the transition metal complex and fluorescence light emitted by the rare earth complex have distinguishable wavelengths, and an excitation light range for exciting the fluorescence of the transition metal complex and an excitation light range for exciting the fluorescence of the rare earth complex comprise same wavelengths.

4. The temperature sensitive paint of claim 1, wherein the binder comprises components for forming a polyurethane matrix.

5. The temperature sensitive paint of claim 1, wherein fluorescence light emitted by the transition metal complex and fluorescence light emitted by the rare earth complex have essentially the same wavelengths.

6. The temperature sensitive paint of claim 5, wherein an excitation light range for exciting the fluorescence of the transition metal complex and an excitation light range for exciting the fluorescence of the rare earth complex have different wavelengths.

7. The temperature sensitive paint of claim 6, wherein the transition metal complex is a Ru(trpy) complex wherein the europium complex is a europium complex selected from an $Eu(trc)_3$ complex and an $Eu(hfc)_3$ complex.

8. The temperature sensitive paint of claim 1, wherein the transition metal complex is a ruthenium complex.

9. The temperature sensitive paint of claim 8, wherein the ruthenium complex is a Ru(trpy) complex.

10. The temperature sensitive paint of claim 8, wherein the rare earth complex is an europium complex.

11. The temperature sensitive paint of claim 9, wherein the europium complex is an $Eu(tfc)_3$ complex.

12. The temperature sensitive paint of claim 9, wherein the europium complex is an $Eu(hfc)_3$ complex.

13. A temperature sensitive paint comprising:
a binder for forming a polyurethane matrix,
a Ru(trpy) complex embedded in the binder and displaying a temperature dependent fluorescence, the fluorescence of the Ru(trpy) complex showing a maximum relative temperature sensitivity at a first temperature, the Ru(trpy) complex serving as a first temperature probe in a first temperature range about the first temperature,
a europium complex selected from an $Eu(tfc)_3$ complex which is also embedded in the binder and displays a temperature dependent fluorescence, the fluorescence of the europium complex showing a maximum relative temperature sensitivity at a second temperature, the europium complex serving as a second temperature probe in a second temperature range about the second temperature,
the second temperature being higher than the first temperature by 60 to 120 Kelvin,
fluorescence light emitted by the Ru(trpy) complex and fluorescence light emitted by the europium complex having essentially the same wavelengths, and
an excitation light range for exciting the fluorescence of the Ru(trpy) complex and an excitation light range for exciting the fluorescence of the europium complex having different wavelengths.

14. The temperature sensitive paint of claim 13, wherein fluorescence light emitted by the Ru(trpy) complex and fluorescence light emitted by the europium complex have distinguishable wavelengths, and an excitation light range for exciting the fluorescence of the Ru(trpy) complex and an excitation light range for exciting the fluorescence of the europium complex comprise the same wavelengths.

15. The temperature sensitive paint of claim 13, wherein fluorescence light emitted by the Ru(trpy) complex and fluorescence light emitted by the europium complex have essentially the same wavelengths.

16. The temperature sensitive paint of claim 15, wherein an excitation light range for exciting the fluorescence of the Ru(trpy) complex and an excitation light range for exciting the fluorescence of the europium complex have different wavelengths.

* * * * *